May 30, 1950  J. YOUHOUSE  2,509,583
SHADED POLE MOTOR
Filed Jan. 22, 1946
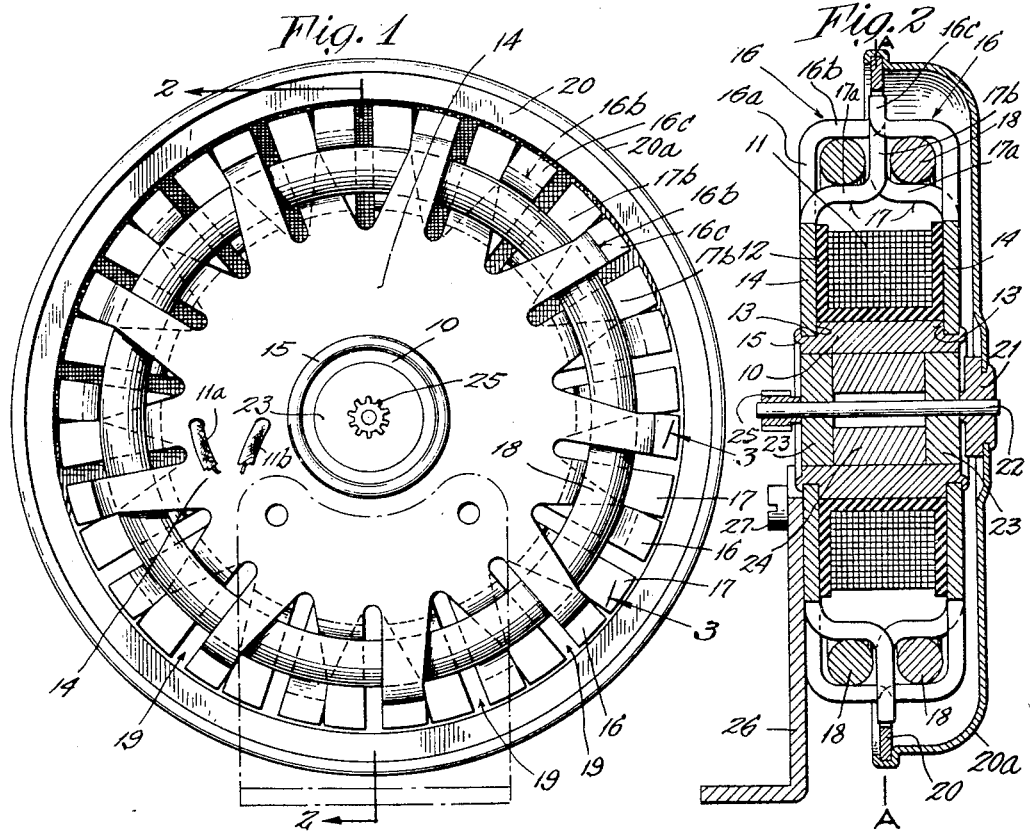
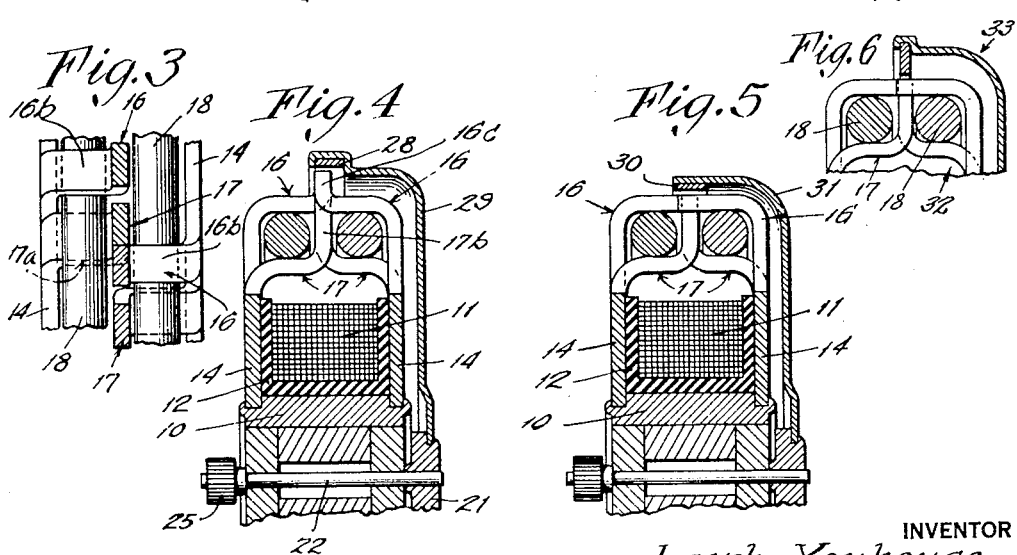
INVENTOR
Joseph Youhouse
BY
Johnson, Kline and Hensel
ATTORNEYS Patented May 30, 1950

2,509,583

UNITED STATES PATENT OFFICE 2,509,583

SHADED POLE MOTOR

Joseph Youhouse, Fairfield, Conn., assignor to Casco Products Corporation, Bridgeport, Conn., a corporation of Connecticut Application January 22, 1946, Serial No. 642,711

19 Claims. (Cl. 172—278)

1

This invention relates to alternating current shaded pole electric motors.

The electric motors described and illustrated herein as embodying the invention are of the small slow-speed, synchronous, self-starting, hysteresis types such as are used in electric clocks and other electrically driven timing devices. However, the invention is not to be limited to the specific motors used for purposes of illustration.

In clock motors it is extremely important to have high efficiency in order that adequate starting and running torque is developed to meet all conditions of use, while at the same time holding the power consumption to a very small value for economic and other obvious reasons.

An object of the present invention is to provide such a motor which has a slow operating speed minimizing wear, has high starting and pull-out torques to insure uniform and satisfactory operation under all conditions of use, and yet very small power consumption. This is accomplished by the provision of a shaded pole alternating current motor having a novel symmetrical and balanced field structure which provides field poles having equal magnetic strength, and having shading means associated with the said structure in such a manner that the maximum benefit is obtained from the shading. Due to the equalization of the magnetic strength of the field poles, and to the shading arrangement therefor which minimizes undesirable leakage from the shaded poles, a maximum motor torque and efficiency are obtained.

In the specific embodiments of the invention illustrated herein, the motor magnetic field structure comprises a comparatively short core member having an energizing coil encircling the same, the ends of the core member having field pieces located at each side and coextensive with the coil. The two field pieces are substantially identical with each other and have sets of marginal fingers arranged in a unique manner so that one set of fingers of each piece may be efficiently shaded, and so that the sets of fingers extend into a central zone symmetrically located and encircling the magnetizing coil. The fingers of one field piece extend between the fingers of the other field piece, and certain of adjacent fingers are brought into close proximity or in contact with each other, thereby to provide magnetic leakage paths which have a beneficial effect in producing a smoothed rotating magnetic field. The arrangement of the field pieces and fingers is such that opposite magnetic paths of equal length are provided for the field flux, thereby equalizing the flux strength at the field poles. Also, the shading means for the pole fingers are located closely adjacent both the tips and base portions thereof, thereby reducing to a minimum

2 any undesirable magnetic leakage from the shaded fingers. Encircling the tips of the fingers is a hysteresis ring rotor carried by a rotatable supporting structure, the said rotor reacting to the strong and balanced flux pattern at the finger tips to produce high starting and running torque with small power input.

A feature of the invention is the compactness, simplicity and economy of the field structure which produces the desired rotating balanced magnetic flux pattern adjacent the hysteresis ring rotor.

Other features and advantages will hereinafter appear.

In the accompanying drawing:

Figure 1 is a side or end elevation of a motor illustrating one embodiment of the invention.

Fig. 2 is a diametric section taken on the line 2—2 of Fig. 1.

Fig. 3 is a fragmentary section taken on the line 3—3 of Fig. 1.

Fig. 4 is a fragmentary diametric section of a motor illustrating a modification of the invention.

Fig. 5 is a fragmentary diametric section of a motor illustrating another modification of the invention, and Fig. 6 is a fragmentary diametric section of a motor showing yet another modification of the invention.

Referring to Figs. 1 and 2, the motor illustrated comprises a magnetic core 10 of cylindrical shape, carrying and encircled by a magnetizing coil 11 wound on an insulating spool 12. The core 10 has a reduced outside diameter at each end, providing shoulder 13 against which are secured disk-like field pieces 14, the latter being retained on the core by laying over the core edges 15.

According to the present invention each field piece or disk 14 is provided with one set of marginal fingers 16 and a second set of marginal fingers 17, the base portions 16a of the fingers 16 extending radially from the disk, and the tip portions 16b of the fingers extending laterally of the disk parallel with the core 10. The extreme tips 16c of all of the fingers 16 are bent to extend outward radially, the tips 16c of one disk extending between the tips 16c of other disk so that all of the tips lie in a common plane indicated by the line A—A of Fig. 2, which plane is substantially a plane of symmetry with respect to the field pieces 14, core 10 and coil 11.

The base portions 17a of the fingers 17 extending laterally of the disks 14, to the said plane A—A of symmetry, being located in staggered or alternating relation, and the tip portions 17b of all of the fingers 17 extend outward radially and lie in the said plane A—A.

As clearly shown in Figs. 1, 2 and 3, the tip portions of the fingers 16 and 17 of one field piece 14 extend between the tip portions of the fingers 16 and 17 of the other field piece, and the said portions are made to extend closely adjacent each other or touch in pairs or groups of two, that is, each finger 17 of one field piece 14 touches only one of the adjacent fingers 16 of the other field piece 14.

Also, according to the present invention, separate means are provided for shading the sets of fingers 16 of the field pieces 14 adjacent the tip portions 16b therefore, the said means comprising circular shading rings 18 extending through the spaces provided between the sets of fingers 16 and 17. The shading rings 18 may be formed from straight lengths of heavy copper wire of circular cross-section, the lengths being bent into the form of circles, and the abutting edges being secured together as by silver soldering. Or, the rings may be of rectangular, square or other cross-section, and may be cut from heavy tubing or from pipe, thereby eliminating the operation, employed with the bent wire, of securing together butted ends.

The shading rings 18 may be located in their associated field structures subsequent to the bending of the fingers 16 and 17 laterally of the disk 19, and prior to the bending of the fingers 17 to extend radially. When the rings have been so positioned between the sets of fingers 16 and 17, the latter fingers may then be bent radially outward by use of a suitable tool.

It will be noted that the fingers 16 and 17 of each field piece 14 outline or define a separate toroid, this term being used as describing a surface of revolution generated by the rotation of a plane closed curve about an axis lying in its plane. Referring to Fig. 1, the plane closed curve of one toroid is the square bounded by the projections of the portions 16a and 16b of one finger 16, and by the portions 17a and 17b of an adjacent finger 17 of the same field piece 14, and the plane closed curve of the other toroid is similarly outlined by adjacent fingers 16 and 17 of the other field piece 14. The two toroids thus outlined are coaxial and may be contiguous, or, as shown in the drawing, intersecting to a limited degree along one or more circular lines lying in the plane A—A of symmetry. The term "contiguous" is employed herein in its usual sense denoting contact.

By the above construction alternating current energization of the coil 11 produces a magnetic field at the tips of the fingers 16 and 17 which is of a symmetrical nature, and which revolves about the axis of the coil, and the strength of the flux at each of the finger tips 16c is substantially equal to the flux strength at the other finger tips 16c. Also, the flux strength at each finger tip 17b is substantially equal to the flux strength at the other fingers tips 17b, the said equality of the fluxes being the result of the symmetrical arrangement of the magnetic field structure, and the equal lengths of the flux paths.

By virtue of the shading rings 18 being located closely adjacent the tip portions 16b, and also the base portions 16a of the fingers 16, in contradistinction to the structure of prior proposals wherein the shading means is remote from the finger tips, undesirable magnetic leakage from the said portions to the adjacent unshaded fingers 17 of like polarity is held to a minimum. Other factors in preventing such leakage are the spaces 19 provided between the shaded fingers 16 and the adjacent unshaded fingers 17, the said spaces providing a substantial separation to provide high resistance to leakage flux.

It will be noted, referring to Fig. 2, that the shaded fingers 16 are all of short length, being merely sufficiently long to partially encircle the shading rings 18. Thus, the fingers 16 provide an efficient, short path for the magnetic flux. Also, only the tip portion of each shaded finger 16 and the tip portion of the adjacent unshaded finger 17 of like polarity are juxtaposed and lie in the plane A—A of symmetry, and the said portions are separated a substantial distance by the intervening space 19, with the result that leakage flux between the said portions, which is undesirable, is very small, providing for high motor torque.

A rotor 20 is provided, in the shape of a flat washer of permanent magnet material, encircling and located in close proximity to the tips of the fingers 16 and 17. The rotor 20 is carried within the lip or edge of a cup 20a which is mounted on a hub 21 secured to a shaft 22 extending through bearing blocks 23 within the core 10. Between the bearing blocks 23 a spacer collar 24 is provided, and a driving pinion 25 is secured to the opposite end of the shaft 22. The cup 20a and rotor 20 are thus rotatably mounted with respect to the field structure of the motor.

I have found that by virtue of the shaded fingers 16 all having equal magnetic strengths at any instant, and the unshaded fingers 17 all having equal instantaneous magnetic strengths, together with the shaping of the fingers to accommodate the shading rings 18 closely adjacent the pole tips of the fingers to minimize undesirable leakage flux from the shaded tips, the resultant magnetic pattern at the tips of the fingers produces a high torque in the rotor 19 with but a small power input to the magnetizing coil 11. I thus accomplish a high efficiency in the motor, to the end that adequate torque is available for all conditions of use while maintaining the power input at a satisfactorily low value.

As shown, each field piece 14 has nine fingers 16 and nine fingers 17, thereby producing a motor having a synchronous speed of 400 R. P. M. on 60 cycles. However, the number of fingers 16 and 17 may be changed so as to obtain different motor speeds, if desired, fewer fingers producing faster motor speeds, and vice versa. Thus the motor may be adapted to gear trains of various ratios, and readily employed for industrial timing purposes, and in automatic controls and the like. I have found that a motor having a speed of 400 R. P. M. has, with a few watts power input to the coil 11, a high starting torque and high pull out torque entirely adequate for most small clocks.

It will be noted that my improved field structure as described above provides an extremely short magnetic path around the energizing coil 11, resulting in an efficient magnetic flux-carrying structure.

For purposes of mounting, a bracket 26 is provided, which is secured by screws 27 to one of the field pieces 14, as shown in Fig. 2.

As shown in Fig. 1, lead wires 11a and 11b from the coil 11 may be brought out through apertures in one of the field pieces 14 for connection with a current supply.

A modification of the invention is shown in Fig. 4 wherein a field structure such as that shown in Figs. 1 and 2 has associated with it a rotor 28 carried by a cup 29, the rotor having the shape of a thin cylindrical band. With this type of rotor the flux path from the tips of the pole fingers to the rotor has a greater cross-section, and the rotor iron is more closely associated with the flux of the finger tips so that less magnetomotive force is used in forcing the flux across the air gap into the rotor. As a consequence a rotor of lesser cross-section may be utilized without sacrificing torque.

Another modification of the invention is shown in Fig. 5. In the structure illustrated herein, the extreme tip portions 16b of the fingers 16 are not turned outward to extend radially, but instead are terminated so as to lie in a cylindrical surface, and the tip portions 17b of the fingers 17 are terminated so as to not extend radially beyond the tip portions of the fingers 16. A rotor 30 is provided in the form of a thin cylindrical band, carried within the edge or lip of a cup 31. By this construction the rotor 30 is located broadside in close proximity to the tips of the fingers 16 and 17, with an air gap of larger cross-section than that shown in Figs. 2 and 4, thereby enabling a still further reduction in the rotor thickness to be made without adversely affecting the motor torque.

Another modification of the invention is shown in Fig. 6, wherein a field structure 32 is provided substantially identical with that shown in Fig. 5, and wherein a rotor structure 33 is provided similar to that shown in Figs. 1 and 2. An advantage of utilizing the rotor structure 33 is that it is less difficult to hold to very close tolerances on the inside diameter of the rotor, and therefore the air gap between the rotor and the field structure may be made of extremely short length without danger of the rotor touching. The field structure 32 shown in Figs. 5 and 6 does not require that the tips of the shaded pole fingers 16 be turned radially outward, thereby simplifying the fabrication of the structure.

Variations and modifications may be made within the scope of this invention and portions of the improvements may be used without others.

I claim:

1. In a motor, a pair of electrically conducting bands constituting shading coils; a magnetizing coil; and a structure of magnetizable material associated with the magnetizing coil, including two portions each having pole fingers, said portions being magnetized oppositely by the coil and the fingers of one portion extending adjacent to the fingers of the other portion, some only of the fingers of one portion extending between one band and said magnetizing coil and some only of the fingers of the other portion extending between the other band and said magnetizing coil.

2. In a motor, a pair of electrically conducting bands constituting shading coils; a magnetizing coil; and a structure of magnetizable material associated with the magnetizing coil, including two portions each having pole fingers, said portions being magnetized oppositely by the coil and the fingers of one portion extending adjacent to the fingers of the other portion, some only of the fingers of each portion extending inside their associated band and other fingers of each portion extending outside of their associated band and being shaded thereby.

3. In a motor, a pair of substantially identical electrically conducting bands constituting shading coils; a magnetizing coil; and a structure of magnetizable material associated with the magnetizing coil and symmetrical thereto, including two substantially identical portions each having integral pole fingers and providing flux paths of substantially equal length and cross-section, said portions being magnetized oppositely by the coil and the fingers of one portion extending adjacent the fingers of the other portion, some only of the fingers of one portion extending between one band and said magnetizing coil and some only of the fingers of the other portion extending between the other band and said magnetizing coil to provide unshaded pole fingers.

4. In a motor, a pair of electrically conducting bands constituting shading coils, a magnetizing coil; and a structure of magnetizable material associated with the magnetizing coil, including two portions each having pole fingers, said portions being magnetized oppositely by the coil and the fingers of one portion extending adjacent to the fingers of the other portion with the tips of said fingers extending along radial lines and lying substantially in a common plane, some only of the fingers of one portion extending between one band and said magnetizing coil and some only of the fingers of the other portion extending between the other band and said magnetizing coil.

5. In a motor a magnetizing coil; a magnetizable structure associated with the coil, having two portions magnetized oppositely by the coil, each of said portions having pole fingers and the fingers of one portion extending adjacent to the fingers of the other portion, the said fingers of the portions being shaped and located to define and lie in separate toroids respectively; and shading conductor means associated with each of the toroids defined by said fingers, each said conductor means being the sole such means associated with its respective toroid and being shaped to provide an electric current path confined solely within its respective toroid.

6. In a motor, two members of magnetizable material having pole fingers, the fingers of one member extending between the fingers of the other member and the said fingers of the members being shaped and located to define and lie in adjacent identical toroids respectively; a magnetizing coil mounted between the members; and shading means confined solely within each of the toroids defined by the said fingers with some of said fingers lying in the space between the shading means.

7. In a motor, two members of magnetizable material having pole fingers, the fingers of one member extending between the fingers of the other member and the said fingers of the members being shaped and located to define and lie in adjacent toroids respectively which toroids have equal diameters, are coaxially positioned and are at least substantially contiguous; a magnetizing coil mounted between the members; and shading means extending within the toroids defined by the said fingers.

8. In a motor, two plates of magnetizable material located broadside to each other and having marginal fingers, the fingers of one plate extending between the fingers of the other plate and the fingers of the plates being shaped and located to define and lie in adjacent substantially contiguous and coaxial toroids respectively; a magnetizing coil mounted between the plates; and annular shading means extending within the toroids defined by the said fingers.

9. In a motor, a pair of electrically conducting bands constituting shading coils; a magnetizing coil; a structure of magnetizable material associated with the magnetizing coil, including two similar portions each having integral pole fingers, said portions being magnetized oppositely by the coil and the fingers of one portion extending adjacent to the fingers of the other portion, some only of the fingers of one portion extending between one band and said magnetizing coil and some only of the fingers of the other portion extending between the other band and said magnetizing coil; and a rotor of magnet material disposed in close proximity to the said pole fingers.

10. In a motor, a pair of electrically conducting bands constituting shading coils, a magnetizing coil; a structure of magnetizable material associated with the magnetizing coil, including two similar portions each having integral pole fingers, said portions being magnetized oppositely by the coil and the fingers of one portion extending adjacent to the fingers of the other portion with the tips of said fingers extending along radial lines and lying substantially in a common plane, some only of the fingers of one portion extending between one band and said magnetizing coil and some only of the fingers of the other portion extending between the other band and said magnetizing coil to provide unshaded pole fingers; and a rotor of magnet material, comprising a ring having an angular cross-section, said rotor being disposed in close proximity to the edges and sides of the said finger tips.

11. In a motor, two disks of magnetizable material located coaxially and broadside to each other, each disk having a set of marginal fingers the base portions of which extend radially from the disk and the tip portions of which extend laterally with respect to the disk, and having a second set of marginal fingers the base portions of which extend laterally of the disk and the tip portions of which extend radially, the fingers of one disk extending between the fingers of the other disk, a magnetizing coil located between the disks; and a shading ring located between the sets of fingers of each disk.

12. In a motor, a pair of electrically conducting bands constituting shading coils; a magnetizing coil; and a structure of magnetizable material associated with the magnetizing coil, including two portions each having pole fingers, said portions being magnetized oppositely by the coil and the fingers of one portion extending adjacent to the fingers of the other portion, some only of the fingers of each portion extending inside their associated bands and other fingers of each portion extending outside of their associated bands and being shaded thereby, the said bands being located closely adjacent the tips of the shaded fingers.

13. In a shaded pole motor, a pair of electrically conducting bands disposed in side by side relation and constituting shading coils; a magnetizing coil; and a structure of magnetizable material having two portions disposed on opposite sides of the magnetizing coil to be oppositely magnetized thereby, said two portions having pole fingers, some of the fingers of each portion extending between the magnetizing coil and one of said pair of bands and into the space between the bands.

14. In a shaded pole motor, a pair of electrically conducting bands disposed in side by side relation and constituting shading coils; a magnetizing coil; and a structure of magnetizable material having two portions disposed on opposite sides of the magnetizing coil to be oppositely magnetized thereby, said two portions having pole fingers extending between the bands and constituting the only structure disposed therebetween.

15. In a shaded pole motor, a pair of electrically conducting bands disposed in side by side relation and constituting shading coils; a magnetizing coil; and a structure of magnetizable material having two portions disposed on opposite sides of the magnetizing coil to be oppositely magnetized thereby, said two portions having pole fingers extending between the bands and located in a common plane and constituting the only structure disposed between said bands.

16. In a shaded pole motor, a pair of electrically conducting bands disposed in side by side relation and constituting shading coils; a magnetizing coil encircled by both of said shading coils; and a structure of magnetizable material having two portions disposed on opposite sides of the magnetizing coil to be oppositely magnetized thereby, said two portions having pole fingers extending into operative relation with said shading coils to provide shaded and unshaded pole fingers.

17. In a motor, a pair of electrically conducting bands disposed in side by side relation and constituting shading coils; a magnetizing coil; and a structure of magnetizable material having two portions disposed on opposite sides of the magnetizing coil to be oppositely magnetized thereby, said two portions having pole fingers, alternate fingers of each portion extending inside and outside the bands and holding the bands in position adjacent the ends of the fingers.

18. In a motor, a pair of electrically conducting bands disposed in side by side relation and constituting shading coils; a plurality of sets of pole fingers associated with said bands, one finger of each set extending inside one of the bands and into the space between said bands and separating said bands and the other finger of each set extending outside of the band; and means for oppositely magnetizing the sets of fingers associated with each band.

19. In a shaded pole motor, a magnetizing coil having end surfaces defining parallel planes, a pair of electrically conducting bands disposed in side by side relation and substantially coaxial with said coil, both of said bands lying between said planes, a structure of magnetizable material disposed in mounting relationship with said magnetizing coil and having two portions disposed at opposite ends of said magnetizing coil to be oppositely magnetized thereby, said two portions having parts thereof extending into operative relation with said bands to support and position said bands with respect to said magnetizing coil, said parts including pole fingers so arranged with respect to said bands that certain of the poles provided by said fingers are shaded while others thereof are unshaded.

JOSEPH YOUHOUSE.

REFERENCES CITED

The following references are of record in the file of this patent:

UNITED STATES PATENTS

| Number | Name | Date |
|---|---|---|
| 2,000,516 | Haydon | May 7, 1935 |
| 2,305,963 | Hansen et al. | Dec. 22, 1942 |

FOREIGN PATENTS

| Number | Country | Date |
|---|---|---|
| 558,022 | Great Britain | Dec. 15, 1943 |